06-87  AU 115   EX
1/16/76  XR  3,992,216

United States Patent [19]
Kirschner

[11] 3,992,216
[45] Nov. 16, 1976

[54] LIGHTWEIGHT AGGREGATE FOR CONCRETE AND METHOD FOR MAKING SAME

[76] Inventor: Leon I. Kirschner, 7650 Lavergne Ave., Skokie, Ill. 60076

[22] Filed: July 24, 1974

[21] Appl. No.: 491,399

[52] U.S. Cl. .............. 106/288 B; 106/72; 106/304; 252/62.56; 106/87; 106/41
[51] Int. Cl.$^2$........................... C04B 15/00
[58] Field of Search ............ 106/288 B, 304, 308 B, 106/87, 40 R, 309, 122, 97, 41; 264/42; 252/62.56

[56] References Cited
UNITED STATES PATENTS

| | | | |
|---|---|---|---|
| 2,902,379 | 9/1959 | McCollum et al. | 106/97 |
| 2,961,399 | 11/1960 | Alberti | 106/97 |
| 3,140,956 | 7/1964 | Kamlet et al. | 106/97 |
| 3,258,349 | 6/1966 | Scott | 106/41 |
| 3,425,577 | 2/1969 | Copley | 106/40 R |
| 3,844,812 | 10/1974 | Fishwich | 106/72 |
| 3,854,972 | 12/1974 | Kratochvil | 106/288 B |

*Primary Examiner*—Winston A. Douglas
*Assistant Examiner*—J. V. Howard
*Attorney, Agent, or Firm*—Max R. Kraus

[57] ABSTRACT

The invention provides a lightweight aggregate for eventual use in making concrete having commercially acceptable compressive strength. Bloating agents of iron oxide serve to greatly expand conventional aggregate under conventional heat treatment. Small beads of heat decomposable plastic may also be mixed with finely divided aggregate base material prior to pellet extrusion after which furnace heat treatment creates a strong, porous pellet. Modifications in handling the aggregate process improve product control and in some of the completed aggregate serve to seal outer surfaces of aggregate against fluid penetration.

7 Claims, 4 Drawing Figures

3,992,216

LIGHTWEIGHT AGGREGATE FOR CONCRETE AND METHOD FOR MAKING SAME

GENERAL BACKGROUND

This invention relates to lightweight aggregate for use with cement in connection with ultimate casting of concrete. Lightweight aggregates are old, generally, and used in making a concrete having a lower than normal density. A serious objection to prior aggregates for lightweight concrete resides not only in the lack of uniformity of characteristics of the concrete, due principally to non-uniformity of pieces of aggregate, but in addition thereto, a sub-normal compression strength in the finished concrete.

Lightweight aggregate has been prepared from cinders, pumice, Perlite, slag, shale, clay and other similar materials which are susceptible to expansion at high temperature. For the expanded product to be commercially acceptable for use in concrete, a compressive strength of the concrete from about 3,000 psi to 5,000 psi must be attained. Because of such strength requirements, the basic material used in making such aggregate has generally been limited to shale, slate or clay.

The procedures used in the production of lightweight aggregates have been generically referred to as "bloating" and materials or agents used have been generally designated as bloating agents.

Aggregate is presently produced in two general forms or manners:

1. Crushed and sized pieces of base materials (rock, shale, clay, etc.), heat treated at about 2,000° F. for an appropriate period of time.
2. Finely divided base materials, sometimes mixed with other ingredients, and provided with water to make a paste, which is extruded to make pellets, then heat treated as above.

In connection with form (1), the material is maintained in a dry condition until mixed with cement and water for use in making concrete. In both forms, the heat treatment suffices to drive out material as gases and, depending upon the structure of the base material, serves to reduce the density of such material. This bloating effect on the base material may vary somewhat depending upon the locality from where the base material is obtained. The characteristics of the aggregate resulting from the procedures in connection with form (1) classification, consequently may make it difficult to produce a uniform product with regard to density and, in particular, do not provide as much of a bloating action or even a uniformity of bloating action as would be required for maintaining the final characteristics of the aggregate to a reasonably satisfactory level of uniformity.

With regard to the form of aggregate set forth in (2), present practice involves the extrusion of the pasty mass through a die to create sized pellets, and heat treating such pellets. Such pellets should be porous and strong in compression but frequently lack desired porosity and are characterized by a tendency to be friable. The pellets sometimes agglomerate into large masses due to contiguous pellets caking during the heat treatment. The fine particles used in connection with form (2) are frequently obtained originally from the fines created in connection with crushing and sizing pieces of base material in connection with form (1).

THE INVENTION GENERALLY

One form of the invention generally contemplates the application to the base material set forth in forms (1) and (2) previously identified, of an oxide mixture of iron in finely divided form of $Fe_3O_4$, ($FeO$ and $Fe_2O_3$) a so-called magnetic oxide of iron. This oxide of iron is available in quantity as a by-product of the operation of basic oxygen furnaces in connection with refining of iron. In connection with the operation of such furnaces, emmissions from furnaces include the aforementioned double oxide of iron, such oxide of iron being in finely divided form and recoverable by suitable means from emissions to a smoke stack through which the furnace gases and emmissions pass into the atmosphere, usually after steps have been taken to trap particulates from polluting the atmosphere.

In the application of such iron oxide, a range of from about 2% to about 7% by weight is applied to the base aggregate material. The oxide is preferably in the form of finely divided material having a particle size ranging from about .5 to about 5 microns in diameter (1 micron is 1 millionth of an inch). The fineness of such particles is such that an aqueous suspension may be readily formed and such suspension may be sprayed on the base aggregate material in the case of form (1) consisting of crushed and sized base material.

While an aqueous suspension of the iron oxide is preferred for application to the base aggregate material, it is possible to dust the iron oxide on the aggregate material. It is understood that such iron oxide in all cases is applied to the base aggregate material prior to the heat treatment.

With regard to form (2) of the aggregate procedure, i.e., the production of an aqueous paste of aggregate base material and extrusion thereof through a die for the production of pellets, the iron oxide is incorporated in the same percentage range as in connection with form (1). The iron oxide is mixed throughout the base aggregate material prior to extrusion into pellets. The pellets extruded after passage of material through the die, will contain the desired quantity of iron oxide uniformly distributed throughout the mass of the pellet.

I have found that the pellets, after heating in the kiln or furnace, and this is also true of the crushed and sized base aggregate material identified previously as form (1), results after the heat treatment in an aggregate material which has substantial compressive strength but which is at the same time quite porous. The heat treated aggregate contains numerous well distributed cells or pores, or fine passages, with a mechanically strong matrix of aggregate base material, the pores or vesicles or systems of fine voids can have an integrated volume sufficient to effect a substantial reduction in the weight of an aggregate element (pellet or sized piece) as compared to the normal density of the aggregate element when lacking the iron oxide addition as previously set forth.

Not only is the density of the processes aggregate element substantially reduced, as hereinbefore set forth, but in addition thereto, the compressive strength of an aggregate element compares favorably with the compressive strength of a conventional aggregate element, untreated for obtaining light weight. The reduction in density may be sufficient to endow the new aggregate with a weight of less than about 40 pounds per cubic foot.

Insofar as the compressive strength of a concrete including the new aggregate is concerned, it should be understood that as in conventional concrete, the compressive strength involves as a factor the relative percentages of cement and aggregate, such percentages ranging over a range depending in part upon the ratio of mix of aggregate and cement.

The finely divided iron oxide present in the aggregate base material functions as a desirable and highly effective bloating agent during the heat treatment. Due to some possible variation of composition in supposedly similar aggregate base material, some variation of the amount of iron oxide, heat treatment time and temperature may be necessary. Such procedure initially may be determined by simple experiment to determine the characteristics of the final aggregate product. Such a control procedure is frequently necessary in many chemical or mining operations.

The improvement in connection with form (2) of the aggregate (production of pellets by extrusion) is particularly benefited by the addition of the iron oxide in that the aggregate base material with the iron oxide addition results in improved product control during the kiln heating. As hereinbefore pointed out, without the iron oxide addition, extruded pellets during the heat treatment had a tendency to agglomerate or fuse together, making large masses whose size and weight became disturbing factors in the process and resulted in loss of control during the heat treatment and a product which became difficult to handle and use. As a result of the invention herein, the extruded pellets during the heat treatment maintain their respective physical identities and thus result in aggregate material having generally similar pellet size with similar properties of porosity, as well as desirable compressive strength characteristics. It should be realized that concrete fundamentally consists of cement as a binder covering the outer surfaces of aggregate particles to retain them in fixed relative position and that a substantial element in the compressive strength of concrete resides in the compressive strength of aggregate elements. For this reason, the control over the extent and distribution of porosity within aggregate elements while maintaining compressive strength of such elements becomes highly important.

PREFORMING VOIDS IN THE AGGREGATE

It is possible to introduce into the paste prior to extrusion into pellets what might be designated as preformed voids which appear within the pellet material and are encapsulated within the pellet body prior to pellet heat treatment. This may be obtained by the addition, within the pasty mass prior to extrusion into pellets, of microspheric beads, solid or hollow, available commercially in sizes up to about one-half inch or more. Such beads are available commercially in polystyrene, polyurethane, glass and other thermoplastics, and may be produced by bubbling air through the material in molten form. The beads, as commercially available, come in various sizes, any particular size usually varying over a moderate range. For the purposes of this invention, a range of possible bead sizes from the tiniest of beads up to about one-eighth inch in outer diameter may be used. The beads may be solid or hollow, mixed in size within this range or preferably may be of one commercial size plus or minus generous dimensional departures. The beads are mixed in with the aqueous paste of aggregate base material prior to extrusion to form pellets. The beads, for the most part, should pass through die apertures without substantial crushing. It is desired to have substantially all beads within extruded pellets retain their original structure. The distribution of the beads throughout a pellet may vary, depending upon the amount of voids to be created within a pellet. Such pellets impregnated with beads are heat treated in a kiln or furnace. Under the influence of the high temperature to which the pellets are subjected, air or gas within the beads in the aggregate base material expands (the amount of expansion may be determined by the temperature, length of heat treatment, viscosity of the pellet mixture prior to what may be termed as a sort of sintering of the pellet aggregate base material and decomposition of bead material). Insofar as glass beads are concerned, the glass bead may maintain its integrity to some degree or may fuse with the base material of the aggregate to form a cell or pore. Insofar as plastic bead materials are concerned, such plastics are generally organic compounds which are susceptible to decomposition under furnace heat and temperature to release not only the air or gas content if present in a bead, but also to decompose the chemical compounds comprising the beads so that the plastic beads may disappear completely as escaped gases. At any rate, the beads create voids within the aggregate base material so that a pattern of closed cells is created within a pellet after heat treatment thereof. Such pellets show cells dispersed throughout the pellet material, the cells or voids being substantially larger than the original plastic beads and the density of the entire pellet being reduced substantially, depending upon the density of beads in the original material. The volume of an original bead in a pellet results in a void in such pellet, after heat treatment, where the ratio of void to original bead size may range from about 3 to about 20. Thus, an original bead having an outer diameter of about 1/64 inch will leave a void within a heat treated pellet of from about 3/64 inch to as much as about 20/64 inch. The ratio of void to original bead size may be determined during the preparation of the pasty mass by control of the viscosity. As pointed out later, the iron oxide, previously identified, may be incorporated in the paste prior to extrusion, this tending to increase viscosity. The amount of such iron oxide to be added for increased viscosity can be easily determined by simple experiment in a trial run.

In general, for a concrete having good compressive strength, aggregate voids no larger, for the most part, than about four or five 64ths inch should be provided. However, voids larger or smaller may be provided and the spacing between voids should be great enough so that good compressive force is provided. For minute beads, the individual particles may be solid decomposible plastic, which will create voids during heat treatment.

The decomposition of the plastic beads under high temperature in the kiln — the temperature may be of the same order as used in conventional treatment of aggregate pellets — provides a porous pellet structure. The nature of the bead material — the exact plastic material used — will have some effect, different plastics usually providing closed cells but the number and distribution of the voids throughout a pellet being determined by the number of beads used per unit volume of pellet material. As an example, the ratio of pellet void to pellet aggregate may be high enough so that the pellet weight is reduced by more than 10% with negligible reduction of pellet compression strength or concrete compression strength.

Inasmuch as voids formed by the beads are closed, a pellet matrix is generated whose mass or density can be reduced to a desired figure and closely controlled. The closed cells prevent ingress of water. This is a desirable characteristic for the reason that there will be substantially no absorption of liquid by the aggregate when the aggregate and cement and water are all mixed-together in preparation for the formation and setting of concrete. In particular, the use of such an aggregate permits precision addition of water to the mixture of cement and aggregate consistent with the hydration of the cement during setting, all of such water being used in the chemical reaction involved in the setting of the concrete and substantially no water being used to enter the pores of the aggregate. The absence of such waterlogging in this aggregate provides for minimum absorption of water into the finished concrete and at the same time maintain a density substantially at the value of the aggregate plus hydrated cement, thus making for a uniform and lightweight concrete having substantial compressive strength. The aggregate itself, while having a large integrated volume of void — this may be as an example more than 10% of the total volume of a pellet after heat treatment — makes for high compressive strength of the heat treated pellet due to the fact that the voids are a system of cells separated from each other by sufficient pellet material to provide a matrix having substantial compressive strength itself.

WATERPROOFING IRON OXIDE TREATED AGGREGATES

As previously pointed out, the interior structure of pellets produced by the application of iron oxide to the aggregate base material is generally non-cellular and may provide a porous structure wherein relatively fine but long passages within the pellet are created. Such passages, when they terminate at the outer surfaces of a pellet, will permit water to gradually enter the pellet aggregate after the pellet has been heat treated. By applying to the surface of the pellet or collection of pellets forming in aggregate a fluidized film made up of a suspension of microscopically small (one-half micron or less) particulates, any internal open network interstices of the pellet aggregate will be effectively blocked to penetration by water or other solutions. The particulates may consist of colloidal silicon dioxide suspended in a wax (this is a by-product of the decomposition of ethylsilicate in the lost wax casting process), the wax being in molten form and sprayed on the surface of the pellets after heat treatment. The colloidal suspension of the finely divided materials previously referred to may be suspended in a dilute solution — about 0.01% — of methyl cellulose as an example. Other liquids for such suspensions may be used.

BORAX AS A PELLET INTEGRATOR

Borax (sodium borate) may be used in connection with all extruded pellets, prior to heat treatment, to improve the integrity of the pellet. Borax has limited solubility in water or other solvent systems. It is, therefore, desirable to add Borax in desired amounts by introducing Borax in colloidal form into a carrier such as methyl cellulose to form a colloidal gel, the gel itself being created by the use of any oil and a surfactant thickening agent. By thus introducing Borax in quantities in excess of its aqueous solubility, the tonnage yield of extruded pellet aggregate can be greatly enlarged. An additional advantage in connection with introducing Borax into the pasty mass prior to extrusion through a die, resides in the fact that the colloidal Borax gel also acts as a lubricant in connection with the passage of the paste material through the pelletizing dies. The Borax gel may be used in connection with the various procedures for making pelletized aggregate, it being understood that the Borax gel is introduced prior to any heat treatment of the pellets. The Borax addition has no application to the production of aggregates according to the form (1) previously set forth wherein crushed and sized aggregate material is used without any extrusion procedure.

ADVANTAGES OF THE INVENTION

In addition to the advantages previously set forth in the production of aggregates, an economic advantage is obtained by the ready availability of the various ingredients. For example, the iron oxide is readily available. The same is true of the glass or plastic beads, Borax and the various aggregate base materials. The various ingredients and procedural steps required to incorporate the invention into aggregate manufacture and treatment utilizes conventional aggregate handling facilities and provides minimum interference with normal production methods for making aggregate.

The invention provides aggregate of crushed and sized pieces of base materials as rock, shale, clay and the like, bloated to an extent much greater than has hitherto been considered possible, such pieces containing fine passages or vesicles, reducing the density of the aggregate material substantially below its normal density while maintaining to a high degree the compressive strength of the material.

The invention also provides aggregate in pellet form as hereinbefore described, wherein each pellet contains finely divided vesicles or vacuoles distributed throughout a pellet interior sufficiently to provide an aggregate element having a porous structure with individual cells or pores separated by sufficient aggregate material so that a pellet, while substantially reduced in density, when used in concrete will endow such concrete with resistance to compressive force of from about 3,000 pounds per square inch to 5,000 pounds per square inch. The reduction in the density of the pelletized aggregate material is subject to control during the manufacture thereof so that a desirable product will result.

Referring now to the drawing.

Figure 1:
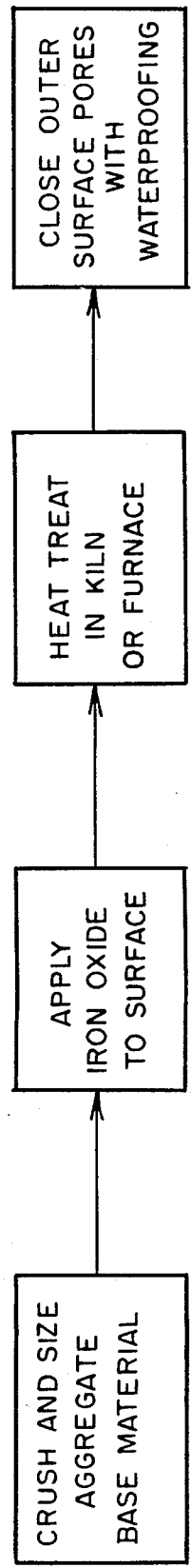
FIG. 1 is a flow diagram illustrating the handling of crushed and sized pieces of aggregate followed by application of finely divided iron oxide thereto after which the material is heat treatment and concluded, if desired, by sealing the outer surfaces of the pieces of aggregate to prevent infiltration of water.

In FIG. 1, the various rectangles are self explanatory. The heat treatment may be carried out in a furnace of kiln, with material to be treated in conventional present day fashion. The step in the last rectangle may be omitted if desired.

Figure 2:
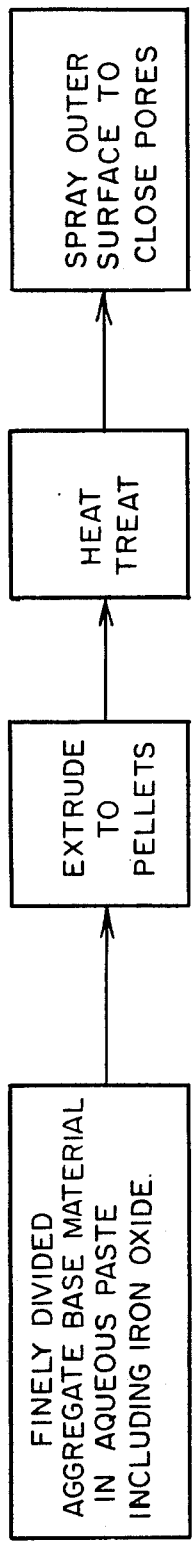
FIG. 2 is a flow diagram illustrating the handling of finely divided aggregate material preparatory to pelletizing, after which the pellets are heat treated and treated by spraying (if desired) to seal against infiltration of water.

In FIG. 2, the finely divided aggregate base material with iron oxide distributed therethrough may be handled as an aqueous paste in an extruder for pelletizing. Such pellets may be any size. As an example, pellets about three-fourths inch long usually with rounded ends and about one-half inch transversely, of generally cylindrical shape are common. Neither shape nor dimensions are important.

Figure 3:
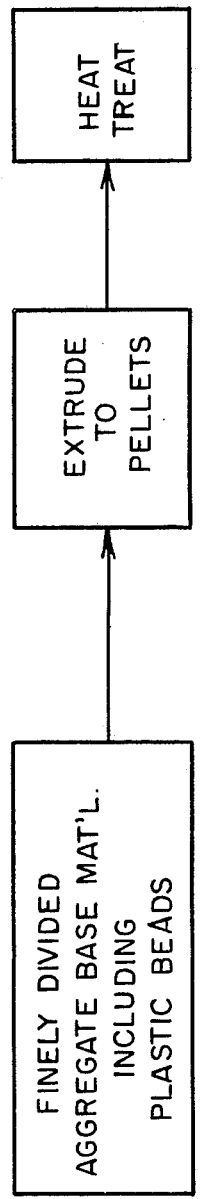
FIG. 3 is a flow diagram similar to figure wherein beads of plastic are mixed with the finely divided aggregate material followed by pelletizing and heat treatment.

FIG. 3 has beads mixed in with material to be extruded. The beads are small enough so that substantially all beads are unaffected by extrusion.

Figure 4:
FIG. 4 is a perspective view of a pellet partly broken away to illustrate voids remaining in the pellet after heat treatment.

FIG. 4 shows a pellet resulting from procedure in FIG. 3. The voids have no particular pattern of distribution and, as seen, are generally circular, indicating a generally spherical, closed space.

What is claimed is:

1. An aggregate in pelletized form consisting of finely divided base material of the class consisting of rock, cinders, pumice, perlite, slag, and clay, as one ingredient and finely divided magnetic oxide of iron, as the other ingredient, intermixed therewith in the proportion of about 2 to 7% by weight of iron oxide to base material, said mixture being in bloated form by having been heated to a temperature of the order of about 2,000° F., said aggregate being characterized by great porosity, and substantial compressive strength, whereby when present in concrete utilizing such aggregate, such concrete has relatively light weight and normal compressive strength.

2. The aggregate according to claim 1, wherein each pellet is the result of heat-treating an aqueous paste extrusion of said mixture in unbloated form.

3. The aggregate according to claim 2, wherein said pellets have enhanced porosity resulting from including heat decomposable plastic beads in the aqueous paste prior to extrusion, said beads originally having been between about 1/64 in. and about 1/16 in. in dimension, the amount of beads throughout said mixture being sufficient to provide desired porosity to said aggregate after said heat treatment.

4. A method of making aggregate for use with Portland cement, said method comprising mixing base material in subdivided form, said base material being of the class consisting of rock, cinders, pumice, perlite, slag, and clay and finely divided magnetic oxide of iron in the proportion of about 2 to 7% by weight of iron oxide to base material, compacting the same to form pellets and heating to a temperature of the order of about 2,000° F to bloat the base material to create porous bodies, said porous bodies having substantial compressive strength and being useful with Portland cement for providing light weight concrete having substantially normal compressive strength.

5. The method according to claim 4, wherein said base material is made into a finely divided form, mixed with said magnetic oxide of iron and water to form a paste, extruded to form pellets and thereafter heated to bloat the base material.

6. The method according to claim 5, wherein small beads between about 1/64 and 1/16 inch of heat decomposable plastic material are mixed in the paste containing such base material and iron oxide, said beads being present in sufficient quantity to create the desired degree of porosity in the finished aggregate, the heat treatment serving to decompose said beads as part of the bloating process.

7. The method according to claim 6, wherein borax in the form of a colloidal gel is mixed with the pellet forming materials prior to extrusion in sufficient quantity to improve pellet extrusions.

* * * * *